United States Patent Office 3,585,063
Patented June 15, 1971

3,585,063
PRODUCTION OF COATED FILM
Timothy Alan Remmington, Hertford, England, assignor to Imperial Chemical Industries Limited, London, England
No Drawing. Continuation-in-part of application Ser. No. 620,678, Mar. 6, 1967. This application Aug. 1, 1968, Ser. No. 749,270
Claims priority, application Great Britain, Aug. 3, 1967, 35,763/67
Int. Cl. C09j 7/02; B32b 27/08
U.S. Cl. 117—47
8 Claims

ABSTRACT OF THE DISCLOSURE

Using a resin obtained by copolymerising the condensation product of acrylamide or methacrylamide and a monoaldehyde with at least one other unsaturated monomer as an intermediate adhesive layer between a base film and a heat-sealable coating for the film.

---

This is a continuation-in-part of our application Ser No. 620,678 filed Mar. 6, 1967.

This invention relates to the production of coated film, and to the film produced thereby, in particular to heat-seal coated polyolefine film.

In our British specification No. 932,652 we describe a method of heat-seal coating olefine polymer or copolymer films in which uncoated film is subjected to a specified treatment to improve the bonding properties of its surface, after which the film is coated with a solution of a thermosetting resin, the thermosetting resin being substantially insoluble in water and its solvent is evaporated off; the film is overcoated with an aqueous dispersion of a heat-seal coating which is then dried off on the film and heated to set the thermosetting resin so that it becomes adhesively bonded to the heat-seal coating and the base film.

In our copending application Ser. No. 620,678 filed Mar. 6, 1967, we provide a process for the production of heat-seal coated organic thermoplastic polymeric films in which the surface of an uncoated film is subjected to a treatment to improve its bonding properties and then coated on at least one surface with a resin comprising a composition obtained by condensing a monoaldehyde with an interpolymer of acrylamide or methacrylamide with at least one other unsaturated monomer in the presence of an alkanol containing from one to six carbon atoms such that said composition has at least some amino hydrogens replaced by —ROR' groups, said R and R' groups being alkylene and alkyl groups corresponding to those of the monoaldehyde and the alkanol respectively and the coated film is over-coated on its coated surface or surfaces with a heat-seal coating and heated to set the resin.

One disadvantage of this process is that it is difficult to estimate the amount of the monoaldehyde that is required in the condensation reaction and therefore there is generally present an excess of the aldehyde. The presence of this excess aldehyde tends to impart an undesirable odour to the heat-seal coated film obtained.

We have now found a method whereby the amount of excess aldehyde in the coated film may be reduced.

According to the present invention we provide a process for the production of heat-seal coated organic thermoplastic polymeric films in which uncoated film is subjected to a treatment as hereinafter described to improve the bonding properties of its surface and then coated on at least one surface with a resin comprising a composition obtained by condensing a monoaldehyde with acrylamide or methacrylamide in the presence of an alkanol containing from one to six carbon atoms so that at least some amino hydrogens are replaced by —ROR' groups, said R and R' groups being alkylene and alkyl groups corresponding to those of the monoaldehyde and the alkanol respectively and subsequently interpolymerising the condensation product with at least one other unsaturated monomer and the coated film is then over-coated on its coated surface or surfaces with a heat-seal coating and heated to set the resin so that it becomes adhesively bonded to the heat-seal coating and the base film.

We also provide heat-seal coated film produced by the process of this invention.

Examples of monoethylenically unsaturated monomers which may be copolymerised with the acrylamide or methacrylamide monoaldehyde condensation product include acrylic acid and its esters, for example methyl acrylate, ethyl acrylate, butyl acrylate, 2-ethyl hexyl acrylate, isobutyl acrylate, hexyl acrylates and octyl acrylates; methacrylic acid and its esters, for example methyl methacrylate, ethyl methacrylte and butyl methacrylate. Other suitable monomers include acrylonitrile, styrene, monomethyl styrene, vinyl toluene, acidic materials such as maleic anhydride, vinyl ethers. The resin may also comprise a coplymer of acrylamide and methacrylamide optionally with one or more other unsaturated monomers. The acrylamide or methacrylamide monoaldehyde condensation product may be copolymerised with one or more monomers which may be selected from the list given above. Although it is preferred that at least one of the monomers should be monoethylenically unsaturated, it is possible to use dienes such as butadiene or chloroprene as the comonomer. Furthermore a tercopolymer derived from the acrylamide and/or methacrylamide monoaldehyde condensation product, another monoethylenically unsaturated monomer and a diene may be used.

The coating resin used in the process of this invention may be modified by blending with other suitable materials, for example the water resistance of the coated film may be improved if the resin is blended with a small amount of an epoxy or a melamine formaldehyde condensation resin.

The monoaldehyde used in the process of the present invention is preferably formaldehyde, in solution in an alkanol containing from one to six carbon atoms, such as butanol; alternatively a formaldehyde yielding substance such as paraformaldehyde or trioxymethylene may be used. It is also possible to use other aldehydes such as acetaldehyde. butyraldehyde and furfural. It is preferred to use two equivalents of the aldehyde for each amide group present although other amounts, generally in the range of 0.5 to 3.5 equivalents of the aldehyde for each amide group present may be used.

Our preferred resins comprise a copolymer containing up to 90% of styrene, up to 80% of an alkyl acrylate, up to 15% of methacrylic acid and 5% to 25% of acrylamide which has been condensed with a solution of formaldehyde in n-butanol containing from 0.2 to 3 equivalents of formaldehyde for each amide group. Resins containing less than 5% by weight of acrylamide or methacrylamide will not set sufficiently to provide an adequate bond between the heat-seal coating and the base film, whereas resins containing more than 25% of acrylamide or methacrylamide tend to cure too quickly thus reducing the adhesion between the heat-seal coating and the base film. A catalyst should preferably be added to the composition to promote the crosslinking of the resin to improve the adhesion between the heat-seal coating and the base film. Suitable catalysts are acids such as maleic acid, oxalic acid or dilute mineral acids. Our preferred catalyst comprises up to 10% by weight of sulphuric acid.

The resin may be applied to the film as a dispersion or as a solution. Economically it would be preferable to apply the resin as a dispersion in water. Aqueous dispersion techniques have the added advantage that there is no residual odour due to the solvent present which is generally the case when an organic solvent is used. However, when using aqueous techniques it is necessary to heat the film to a higher temperature to dry off the dispersant than with systems using an organic solvent or dispersant and these high temperatures will tend to cure the resin before the heat-seal coat is applied, thus reducing the adhesion between the base film and the heat-seal coat. Furthemore the presence of a surfactant, which is generally used to improve the dispersion of the coating in water, tends to reduce the adhesion between the resin and the base film. Thus, it is preferred to apply the resin from an organic solvent or dispersant. Examples of suitable organic solvents include alcohols, aromatic hydrocarbon solvents such as xylene or mixtures of such solvents as is appropriate.

A particularly useful resin is a 50% solids solution of copolymer resin containing 38.5 parts of styrene, 44 parts of ethyl acrylate, 2.5 parts of methacrylic acid and 15 parts of acrylamide which has been condensed with formaldehyde in n-butanol; this resin is then diluted to a 20% solids resin solution with a 50:50 mixture of xylene and industrial methylated spirits (the parts are the proportions of the constituents by weight). Another useful composition is one in which the ethyl acrylate has been replaced by 2-ethyl hexyl acrylate.

Our invention is applicable to films of any organic thermoplastic polymeric material, for example polymers and copolymers of alpha olefines such as ethylene, propylene, butene and 4-methyl pentene-1; linear polyesters such as polyethylene terephthalate and polyethylene-1:2-diphenoxy-ethane-4:4'-dicarboxylate and polymers and copolymers containing vinyl chloride.

The films coated by this invention may be unoriented or may be oriented in one or both directions in the plane of the film and if oriented in both directions the orientation may be equal in those directions or unequal, for example with the higher degree of orientation in a preferred direction (usually the longitudinal direction). The oriented film may be heat set either before or after the coating treatment.

The surface of the film should be subjected to treatment to improve the bonding properties of its surface; this treatment may be physical or chemical treatment which oxidises the film surface. Examples of suitable chemical treatments are to treat the surface of the film with oxidising agents such as chromic acid in sulphuric acid, hot nitric acid or exposure of the surface to ozone. Alternatively the surface of the film may be subjected to exposure of the surface to corona discharge (such treatment is described in British specification No. 715,914); exposure of the surface to ionising radiation, or exposure of the surface to a flame for a sufficient time to cause superficial oxidation but not long enough to cause distortion of its surface. The preferred treatment, because of its effectiveness and simplicity, is the high voltage electric stress accompanied by corona discharge.

By a heat-seal coating polymer is meant any polymer or copolymer which imparts heat-sealability to the film to which it is applied using as may be demonstrated standard heat-sealing equipment (see H. P. Zade "Heat Sealing and High Frequency Welding of Plastics," Temple Press, London, 1959).

Because they give hard coatings and good heat-seal strengths and are also resistant to moisture and have low gas permeability, our preferred heat-seal coatings are copolymers of vinylidene chloride with acrylonitrile. It is particularly preferred to use copolymers containing between 80% and 95% by weight of vinylidene chloride and up to 20% by weight acrylonitrile, these copolymers may contain other monomers such as acrylic acid, itaconic acid and methacrylic acid. The heat-seal coating may be applied to the film as a solution or a dispersion but the solvent or dispersant should not be such that it will dissolve the resin coating already on the film. For economic reasons application as a dispersion is preferred.

Other polymeric coatings which may be applied as dispersions are polyvinyl acetate, partially hydrolysed polyvinyl acetate, butadiene/acrylonitrile copolymers, butadiene/styrene copolymers, butadiene methyl methacrylate copolymers, butadiene/methyl methacrylate/styrene copolymers, methyl acrylate/methacrylic acid copolymers, copolyesters of terephthalic acid and another dicarboxylic acid with a glycol, e.g. those containing not more than 4.0 molecular proportions of combined terephthalic acid to one molecular proportion of combined sebacic acid; copolymers of vinylidene chloride and vinyl chloride, copolymers of vinyl acetate with vinyl chloride, copolymers of vinyl acetate with ethylene and copolymers of vinyl chloride with ethylene.

The heat-seal coating polymer may be obtained in aqueous dispersion by grinding and dispersing it in water using a suitable emulsifying agent. It is, however, preferred to prepare such dispersions by polymerising the monomeric constituents of the heat-seal coating polymer in aqueous emulsion using an emulsifying agent to keep the polymer formed in a dispersed state. It is preferred to use a cationic emulsifying agent since good antistatic properties are thereby conferred on the heat-seal coated film, although some anionic emulsifying agents also confer antistatic properties on the film and may thus be used in the preparation of the dispersion of the heat-seal coating polymer.

The heat-seal coating dispersion may contain additives other than surface active agents, for instance, antioxidants, dyes, pigments, lubricants, and ultra-violet light stabilisers. It is particularly useful to add slip and antiblocking agents. These fall into two classes, (a) comminuted solids which are insoluble in the heat-seal coating for instance, starch, talc, zinc oxide, calcium carbonate, magnesium carbonate, diatomaceous earths such as "Superfloss," silica, kaolin, titanium dioxide, triferric tetroxide and other inorganic oxides, carbonates, silicates, aluminates, and alumino-silicates and finely dispersed polymers such as polypropylene and polyvinyl chloride, the particle size of the slip agent being normally in the range 0.1 to 20 microns, and preferably for best effect in the range 0.2 to 5 microns; (b) waxy additives such as unsaturated fatty acid amides, saturated fatty acid amides such as palmitamide, stearamide, distearamide and alkylene such as methylene and ethylene distearamide; hydroxylated fatty acid amides such as hydroxy stearamide, hydrogenated castor oil, ester type waxes, ether waxes and other hard waxes.

It is found when using the resins of the present invention as intermediate coatings between a base film and a heat-seal coating material that the desired degree of crosslinking of the resin can be obtained by heating the coated film to temperatures below 110° C. This is particularly useful in the production of coated film in which the base film is dimensionally unstable at temperatures approaching its softening point, e.g. biaxally-oriented polypropylene, which is not heat-sealable in conventional heat-sealing equipment and thus requires the application of a heat-seal coat, and which can be dimensionally unstable at temperatures as low as 120° C. If heated for a short time as in a heat-sealer on a conventional packaging machine we have found that biaxially-oriented polypropylene will not tolerate temperatures much above 140° C.

The coated films produced according to the process of this invention exhibit exceptionally high adhesion of heat-seal coat to base film and the films may be readily heat-sealed to form a very strong bond. Thus, values of at least 275 gram/inch for the adhesion of the heat-seal coat and heat-seal strengths of at least 200 gram/inch may be obtained. Furthermore, the heat-seal strength obtained using the process of this invention is found to be virtually independent of thickness of the base film whereas with previously known processes the heat-seal strength has been found to deteriorate with increasing thickness of the base film.

The present invention is illustrated but in no way limited by reference to the accompanying example.

EXAMPLE

A 50% solids resin comprising a copolymer of

| | Parts |
|---|---|
| Styrene | 38.5 |
| Ethyl acrylate | 44 |
| Methacrylic acid | 2.5 |
| N(butoxymethyl) acrylamide (made by condensing formaldehyde with acrylamide in the presence of butanol) | 15 | was diluted to a 20% solids resin with a 50:50 mixture of xylene and methylated spirits. The resin was catalysed with 3% sulphuric acid and coated onto a 14 micron thick biaxially oriented polypropylene film which had been heat set at 150° C. and subjected to a corona discharge treatment. Various samples of the resin coated film were dried at different temperatures and the coated film then over-coated with a heat-seal coat comprising an 88:12 vinylidene chloride:acrylonitrile copolymer and the coated film dried at 110° C. The coating of the resin was about 0.25 micron thick and the heat-seal coating about 2.75 micron thick.

The adhesion of the coating was measured by applying a 1 inch wide strip of "Sellotape" evenly to the coated film, sufficient tape being folded back on itself to allow a firm grip between finger and thumb. Another piece of "Sellotape" was then applied to the back of the sample and in the equivalent position to that on the front. This was then left for a short time to obtain a good bond between the tape and the coating.

A ½ inch wide sample was then cut from the tape/film laminate. This sample was held firmly on a flat surface with one hand while the folded back portion of tape was rapidly jerked back to initiate rupture between the base film and the coating. The force to propagate coat delamination is then measured in a simple tensometer, the rate of pull being 4 inches per minute, and the result converted to grams per inch of the sample.

The heat-seal strength was measured by cutting out a piece of film approximately 30 cm. x 20 cm. and folding the piece along the centre parallel to the longer side with the side under investigation inwards. This folded sample was then placed with the folded edge between and parallel to the jaws and just beyond the line of seal of a "Sentinel Heat Sealer" the jaws of which had been previously adjusted to a temperature of 130° C. and giving a sealing pressure of 5 lb. inch$^{-2}$ and a dwell time of 2 seconds. The seal was made and the sample withdrawn.

Three 1 inch wide test pieces are then cut parallel to the short side of the folded sample and the peel strength of each measured in a simple tensometer. The mean of these three peel strengths is quoted as the Heat-Seal Strength.

The results obtained are set out in Table 1.

TABLE 1

| Temperature at which the anchor coat was dried, ° C. | Heat-seal strength, gram/inch | Adhesion, gram/inch |
|---|---|---|
| 65 | 320 | 200 |
| 75 | 320 | 250 |
| 85 | 300 | 300 |
| 95 | 210 | 300 |
| 105 | 165 | 50 |
| 115 | 135 | 0 |

I claim:
1. Heat-sealable coated organic thermoplastic polymeric film comprising a polyolefin base film at least one surface of which has been subjected to a treatment to improve its bonding properties and having adhesively bonded thereto on at least one of the said treated surfaces a heat-sealable coating, said bonding being accomplished by a resin coating consisting essentially of an interpolymer of at least one monoethylenically unsaturated monomer and a condensation product of acrylamide or methacrylamide condensed with 0.5 to 3.5 equivalents of a monoaldehyde for each amide group and said condensation product being prepared by condensing acrylamide or methacrylamide with the monoaldehyde in the presence of an alkanol having 1 to 6 carbon atoms so that at least some of the amino hydrogens are replaced by —ROR' groups, said R and R' groups being alkylene and alkyl groups respectively.

2. Heat-sealable film according to claim 1 in which the resin is blended with up to 50% of its weight of an epoxy resin.

3. Heat-sealable film according to claim 1 in which the resin is blended with up to 50% of its weight of a melamine formaldehyde condensation resin.

4. Heat-sealable film according to claim 1 in which the monoaldehyde comprises formaldehyde.

5. Heat-sealable film according to claim 1 in which the alkanol comprises n-butanol.

6. Heat-sealable film according to claim 1 in which the thermoplastic polymeric material is oriented in one or both directions in the plane of the film.

7. Heat-sealable film according to claim 1 in which the heat-sealable coating material comprises a copolymer of vinylidene chloride.

8. Heat-sealable film according to claim 7 in which the copolymer contans between 80% and 95% by weight of vinylidene chloride and up to 20% by weight of acrylonitrile, optionally with other monomers.

References Cited

UNITED STATES PATENTS

| 3,250,639 | 5/1966 | Stead | 117—122X |
| 3,394,029 | 7/1968 | MacArthur | 117—76X |

FOREIGN PATENTS

| 826,652 | 1/1960 | Great Britain. |

WILLIAM D. MARTIN, Primary Examiner

B. D. PIANALTO, Assistant Examiner

U.S. Cl X.R.

117—76, 122, 138.8, 161